(No Model.)

F. W. PARSONS.
MICROMETER CALIPERS.

No. 498,813. Patented June 6, 1893.

WITNESSES:
James Cosgrove
Wm. Tallman

INVENTOR
Fred W. Parsons
BY
John W. Loveland
ATTORNEY.

UNITED STATES PATENT OFFICE.

FRED W. PARSONS, OF ELMIRA, NEW YORK.

MICROMETER-CALIPERS.

SPECIFICATION forming part of Letters Patent No. 498,813, dated June 6, 1893.

Application filed August 20, 1892. Serial No. 443,557. (No model.)

*To all whom it may concern:*

Be it known that I, FRED W. PARSONS, a citizen of the United States, residing in the city of Elmira, county of Chemung, State of New York, have invented a new and useful Improvement in Calipers, of which the following is a full, clear, and exact description, reference being had to the accompanying drawings, forming part of this specification.

My invention relates to instruments known as calipers, for measuring objects by increasing or diminishing the distance between the contact points.

The object of my invention is to first, provide means for making a minute and accurate adjustment of the contact points without altering the adjustment of the calipers at the joint; second, to provide means for making the amount of this adjustment accurate, definite and certain. These ends are accomplished by the device illustrated in the accompanying drawings, which form a part of this specification, and in which similar letters of reference refer to similar parts throughout the various views.

Figure 1:
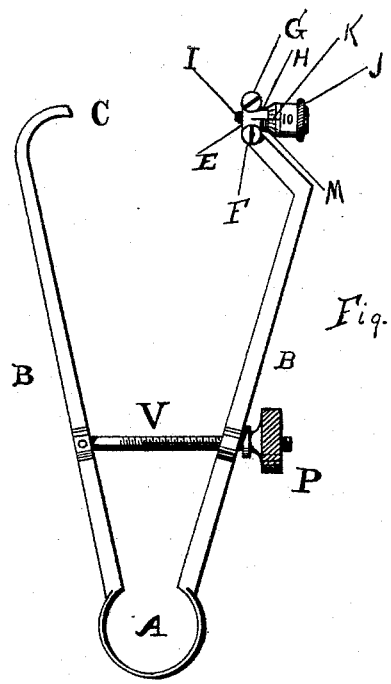
Figure 2:
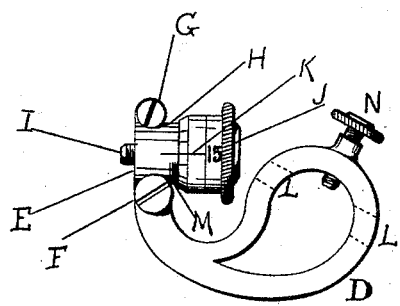
Figure 3:
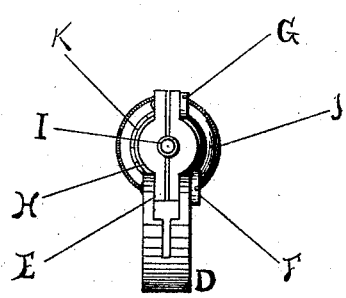

Figure 1 is a side elevation, showing the various parts assembled, and showing the device as made an integral part of the calipers. Fig. 2, is a side elevation showing the parts more in detail; and showing the invention as made in the form of an attachment to be applied to ordinary calipers. Fig. 3, is an end elevation of this attachment.

Referring to Fig. 1 B—B represents the ordinary calipers with a screw adjustment V—P, either inside or outside. A. is the spring joint; C. the usual contact point. Attached to one of the caliper legs is the arm E. pivoted at F. which arm is split or formed of two pieces permitting it to be clamped or tightened by the set screw G. Said arm E is practically a pivoted bearing, or sleeve, on which is marked a scale M. and in which as a bearing is held and revolved the micrometer screw I. having a milled head J. and a scale or index K. marked on the surface; the point I forming one of the contact points of the calipers.

Referring to Fig. 2. this figure shows a modification of the instrument in the form of an attachment to be fitted to any calipers. Here the frame D. is pierced with holes L—L shown by dotted lines, through which the leg of the calipers is inserted and in which it is clamped by the set screw M. or other equivalent means.

Referring to Fig. 3, this shows the pivoted arm or bearing E. made of two pieces or split in order that the micrometer screw may be firmly held by means of the set screw G.

The operation of the device is as follows: The caliper legs are adjusted in the ordinary way to measure the object, the micrometer screw being set at its nearest or farthest distance, as the case may be, or at any desired point. The arm or bearing E. pivoted at F. permits the adjustment of the screw I—J perpendicularly to the object to be measured. By turning the screw a known fraction of a revolution or a number of revolutions as shown on the scaled head K. or longitudinal scale M. on the bearing, this distance between the contact points is increased or diminished by a known unit or fraction of distance and without altering the adjustment of the joint A. of the calipers themselves.

What I claim, and desire to secure by Letters Patent, is—

1. A micrometer screw having its bearing pivoted to calipers.

2. A micrometer screw having its bearing pivoted to calipers at the end of one of the caliper legs.

3. An attachment for calipers consisting of a micrometer screw having its bearing pivoted to a suitable frame and the whole adapted to be attached to calipers.

4. The combination of a micrometer-screw, an arm by which the same may be adjusted perpendicularly to the object to be measured, a clamp for locking said micrometer-screw, and the scale or index marked upon said screw and upon its bearing, substantially as described.

5. The combination of ordinary calipers with a device consisting of a micrometer-screw, having a scale or index, a pivoted bearing in which said micrometer-screw revolves, and by which it can be adjusted perpendicularly to the object to be measured, substantially as described.

6. The combination of ordinary calipers with a device consisting of a micrometer-screw, having a scale or index, a pivoted bearing in which said micrometer-screw revolves, and by which it can be adjusted perpendicularly to the object to be measured, a clamp for locking said micrometer-screw, and a clamp or clamps by which the device may be attached to the caliper-legs, substantially as described.

7. The combination of ordinary calipers with a 6-shaped frame, D, a pivoted arm or bearing, E, the micrometer-screw, I. J., the scale, K, on the screw-head; the scale, M, on the bearing, a clamp for locking said screw and a clamp or clamps, L. N., for attaching said device to the caliper-leg, substantially as described.

FRED W. PARSONS.

Witnesses:
C. R. ROBY,
G. CHAS. GREENER.